(12) United States Patent
Baratin et al.

(10) Patent No.: US 7,340,862 B2
(45) Date of Patent: *Mar. 11, 2008

(54) SEALING GASKET MOUNTED ON A MOTOR VEHICLE DOOR WITH AT LEAST ONE CORNER OF THE GASKET HAVING A SMALL RADIUS OF CURVATURE

(75) Inventors: Sylvain Baratin, Vieilles Maisons (FR); Stéphane Drivon, Chalette sur Loing (FR)

(73) Assignee: Hutchinson, Paris (FR)

( * ) Notice: Subject to any disclaimer, the term of this patent is extended or adjusted under 35 U.S.C. 154(b) by 343 days.

This patent is subject to a terminal disclaimer.

(21) Appl. No.: 10/820,042

(22) Filed: Apr. 8, 2004

(65) Prior Publication Data

US 2004/0261322 A1    Dec. 30, 2004

(30) Foreign Application Priority Data

Apr. 11, 2003 (FR) .................................. 03 04544

(51) Int. Cl.
*E06B 7/16* (2006.01)
(52) U.S. Cl. ..................... 49/479.1; 49/498.1; 49/475.1
(58) Field of Classification Search ............... 49/479.1, 49/498.1, 475.1; 277/921, 645
See application file for complete search history.

(56) References Cited

U.S. PATENT DOCUMENTS

| | | | |
|---|---|---|---|
| 2,379,193 A * | 6/1945 | Shields ...................... 49/496.1 |
| 4,374,880 A | 2/1983 | Mesnel | |
| 4,542,610 A * | 9/1985 | Weimar ...................... 49/490.1 |
| 4,620,354 A * | 11/1986 | Hess et al. .................... 29/417 |
| 4,708,898 A | 11/1987 | Gommier et al. | |
| 4,991,352 A * | 2/1991 | Hyer ......................... 49/489.1 |
| 5,042,200 A * | 8/1991 | Ugawa ....................... 49/490.1 |
| 6,385,839 B2 * | 5/2002 | Kawai et al. ................. 29/451 |
| 6,405,489 B1 * | 6/2002 | Miura ......................... 49/479.1 |
| 6,777,068 B2 * | 8/2004 | Teramoto et al. ......... 428/318.6 |
| 6,935,072 B2 * | 8/2005 | Kogiso et al. ............. 49/490.1 |
| 6,936,320 B2 * | 8/2005 | Kubo et al. ................. 428/36.9 |
| 2001/0027622 A1* | 10/2001 | Mine et al. .................. 49/490.1 |
| 2002/0026751 A1* | 3/2002 | Kawai et al. ............... 49/479.1 |
| 2005/0155294 A1* | 7/2005 | Masuda et al. ............. 49/498.1 |

FOREIGN PATENT DOCUMENTS

WO         02/076778 A1    10/2002

* cited by examiner

*Primary Examiner*—Gregory J. Strimbu
(74) *Attorney, Agent, or Firm*—Clark & Brody

(57) ABSTRACT

A sealing gasket-support combination includes a sealing gasket for mounting on a support on a motor vehicle door. The support includes at least one corner having a small radius of curvature. The gasket includes at least a flexible or semi-rigid fixing portion fixed to the support by an adhesive. The gasket also includes an elastically-deformable tubular portion for providing sealing. The elastically-deformable portion includes a non-deformed cross-section in a free state and a deformed cross-section in a deformed state that is due to the corner of the support, wherein once the gasket has been mounted on the support, the deformed cross-section occupies an area that is substantially within the area occupied by the non-deformed cross section.

13 Claims, 4 Drawing Sheets

SEALING GASKET MOUNTED ON A MOTOR VEHICLE DOOR WITH AT LEAST ONE CORNER OF THE GASKET HAVING A SMALL RADIUS OF CURVATURE

The invention relates to a sealing gasket for mounting on a motor vehicle door presenting at least one corner with a small radius of curvature.

BACKGROUND OF THE INVENTION

Such a sealing gasket comprises in particular at least two portions: a rigid or semi-rigid first portion for fixing on a support; and a flexible and deformable second portion for providing sealing. At present, the sealing gaskets which are used to provide sealing between the body and the doors of a motor vehicle, for example, are positioned either on the body or else on the doors themselves. When the gaskets are positioned on vehicle doors, they are held in place by clips that are secured to the fixing portion of the gasket by means of a fixing rail mounted on the door, or by an adhesive secured to the fixing portion of the gasket, it being understood that adhesive provides the best compromise between cost, weight, and performance.

The second portion of such a gasket that provides the sealing may be tubular in shape, thus making it very tolerant in terms of door-closure energy, but not very strong in the corners of the door. To mitigate that drawback, door gaskets are generally subjected to a thermoforming operation so as to limit the extent to which they collapse in door corners of small radius of curvature.

In general, adhesive gaskets on a door are mounted on their supports by hand or by automatic systems of the static type. Such gaskets are generally delivered in looped form and are also subjected to a thermoforming operation prior to being mounted on doors. The thermoforming operation serves to compensate for gasket collapse in door corners that present a small radius of curvature.

At present, technology makes it possible to envisage putting such gaskets into place by means of robotic systems of the dynamic type. Under such circumstances, it is preferable for the gasket not to be looped in a ring, so that it can be guided continuously by the gasket-laying head of the robotic system.

Under such conditions, it is desirable to envisage supplying such gaskets in long lengths, with the gaskets being, for example, initially stored on a drum, on a pallet, or in a container.

Supplying gaskets in this way presents numerous advantages, and particular mention can be made of the following:
  reducing the cycle time required to put the gasket into place;
  eliminating human intervention for loading a gasket on each cycle;
  considerably reducing the number of packages since a single drum can replace tens of cardboard boxes containing looped gaskets;
  reducing waste and pollution;
  reducing the number of references, since at present gaskets are specific to each type of door; and
  eliminating the operation of bonding a handling tongue placed on the adhesive for each gasket, if the gasket is of the type using adhesive.

In spite of the above advantages, such a solution still leaves in suspension the problem of the localized thermoforming operations performed on such gaskets at door corners of small radius of curvature, it being understood that the gaskets are wound onto drums carrying long lengths of gasket.

OBJECTS AND SUMMARY OF THE INVENTION

A particular object of the invention is to find a novel gasket which is suitable for simplifying the operations of mounting a gasket, in particular for avoiding any operation involving treatment specific to a corner of small radius of curvature on the receiving structure, the novel gasket being suitable in particular for being put into place by a robotic system of dynamic type.

To this end, the invention proposes a sealing gasket for mounting on a support that presents at least one corner of small radius of curvature, the gasket comprising at least a flexible or semi-rigid fixing portion fixed to its support by means of an adhesive, and an elastically-deformable tubular portion for providing sealing, wherein once the gasket has been mounted on its support, the elastically-deformable portion is such that in the corner of said support, its right section is subjected to deformation that occupies an area that lies substantially within the area occupied by the right section of the gasket when in the free state.

In general, the sealing gasket presents an elastically-deformable portion which, starting from its fixing portion, presents two pillars united with each other by an arch, the pillars forming between each other in right section an angle lying in the range 10° to 30°, and advantageously an angle of about 20°, this angle being defined by two straight lines passing substantially through the middles of the two pillars at ⅔ths and at ⅘ths of the total height of the gasket starting from the fixing portion thereof.

Thus, a gasket of the invention will lose height of no more than 2.5 millimeters (mm) in a corner of small radius of curvature of the support.

A gasket of the invention presents the advantage of being suitable for being mounted directly on a motor vehicle door without needing to be subjected to any localized special treatment operation, and in particular any thermoforming in door corners of small radius of curvature, thereby reducing its manufacturing cost, while conferring improved properties to the gasket.

According to an advantage of the gasket of the invention, the shape which is given to it is such that the flattening of its elastically-deformable portion is controlled so that it retains overall the same shape, thereby giving it good sealing properties in zones having a small radius of curvature and a small angle.

BRIEF DESCRIPTION OF THE DRAWINGS

Other advantages, characteristics, and details of the invention appear from the following additional description made with reference to the accompanying drawings, which are given purely by way of example, and in which.

MORE DETAILED DESCRIPTION

Figure 1:
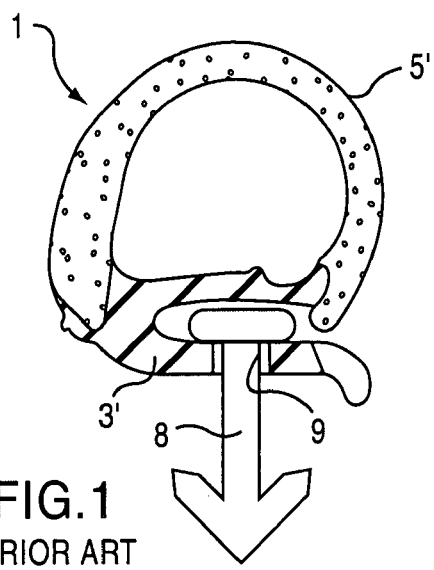
FIGS. 1 and 2 are two section views of two prior art sealing gaskets mentioned in the introduction.
Figure 2:
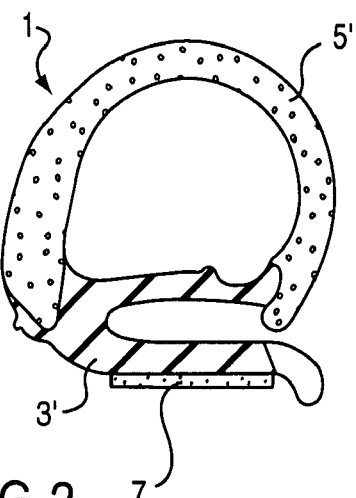

The sealing gaskets 1 as shown in FIGS. 1 and 2 represent the prior art mentioned in the introduction. Such gaskets 1 are intended in particular to provide sealing on a motor vehicle door, and comprise at least a flexible or semi-rigid fixing portion 3' and an elastically-deformable portion 5' which may be tubular in shape. Such gaskets are manufactured by extruding or co-extruding elastomer and/or plastomer materials, and the fixing portion 3' of the gasket may include an adhesive 7 for fixing the gasket to its support.

"The sealing gasket 1 of FIG. 1 has its fixing portion 3' supporting clips or pegs 8 that are engaged in openings 9 through the fixing portion 3'. In contrast, the sealing gasket 1 in FIG. 2 has a strip of double-sided adhesive 7 fitted onto the outside face of its fixing portion."

In the invention, the gasket 10 presents an elastically-deformable tubular portion 5' of a shape such as to avoid any need for a local thermoforming operation on the gasket, in particular in a zone of the support that receives it presenting at least one corner with a small radius of curvature. In general, the term "support having a corner with a small radius of curvature" should be understood as a corner forming an angle of not more than 80° over a radius of curvature of not more than 80 mm, it being understood that this definition does not constitute any kind of limitation on the present invention.

Figure 3:
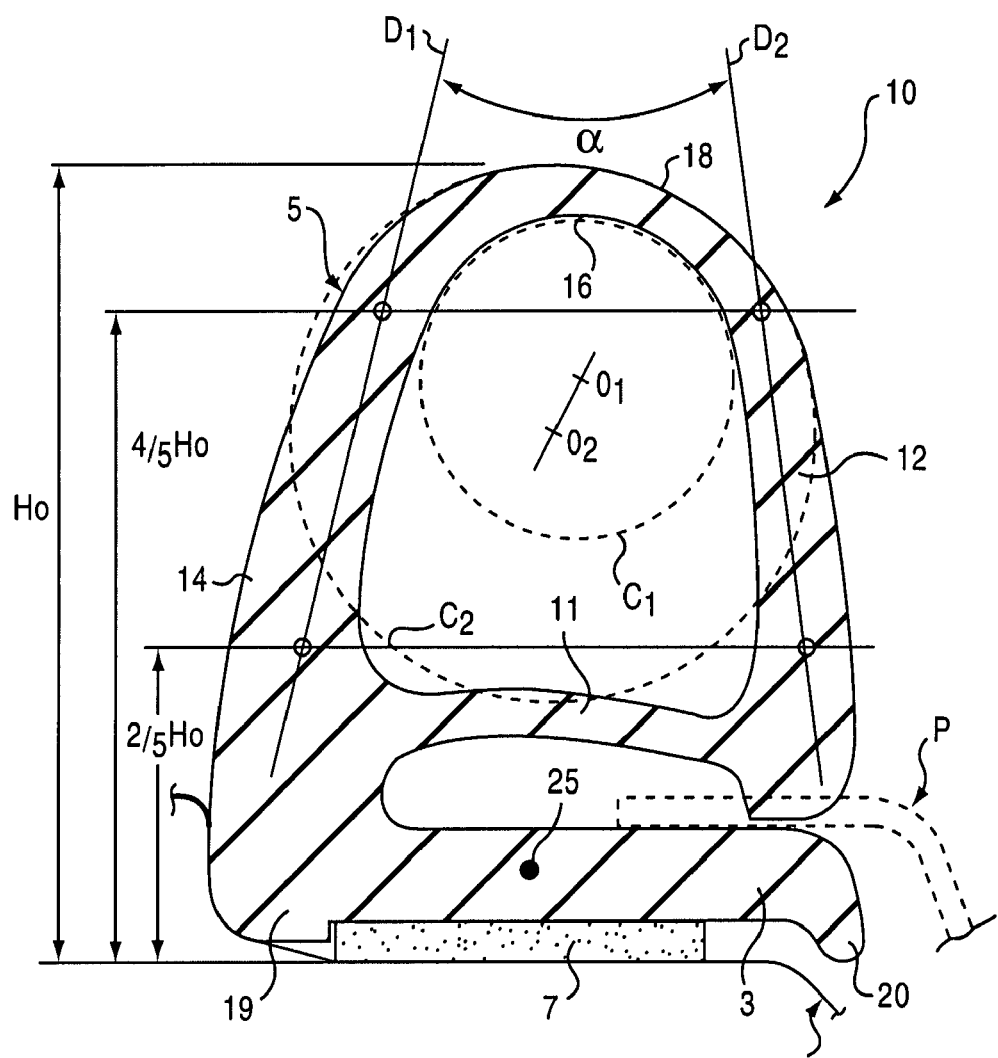
FIG. 3 is a section view of a sealing gasket of the invention.

A gasket 10 of the invention is shown in FIG. 3, its elastically-deformable tubular portion 5 presenting in particular a triangular or trapezoidal shape in right section with two pillars 12 and 14 rising from the fixing portion 3 of the gasket 10. These two pillars 12 and 14 slope slightly towards each other and they are united with each other by a semicircular arch portion. The arch effect is particularly advantageous since the pillars 12 and 14 will tend to move towards each other in the event of the elastically-deformable portion 5 being deformed, whereas in prior art gaskets, these two pillars tend, on the contrary, to move away from each other.

Nevertheless, the extent to which the two pillars 12 and 14 of the elastically-deformable portion 5 of the gasket 10 can move towards each other is limited by the arch, thus providing a gasket 10 that is very stable, and that is of a shape that varies little, with limited loss of height when it is mounted on a door corner having a small radius of curvature, as explained below.

In the example shown in FIG. 3, the elastically-deformable portion 5 includes a base portion 11 which extends parallel to the fixing portion 3 of the gasket 10, being connected thereto at one end in order to avoid any permanent stress on the adhesive 7 and in order to improve the closure energy of the door.

The two pillars 12 and 14 of mean thickness of about 2.5 mm do not extend parallel to each other, but form an angle $\alpha$ which generally lies in the range 10° to 30°, and advantageously is about 20°, and the inner and outer top portions 16 and 18 of the arch lie generally on two circles $C_1$ and $C_2$ of centers $O_1$ and $O_2$ that are spaced apart from each other by a distance of more than 0.7 mm.

More precisely, the angle $\alpha$, which is formed between the two pillars 12 and 14 of the elastically-deformable portion 5 of the gasket 10, is defined overall by two straight lines $D_1$ and $D_2$ passing through points at $\frac{2}{5}$ths and at $\frac{4}{5}$ths of the total height $H_0$ of the gasket 10 starting from its fixing portion 3.

The sealing gasket 10 can be fixed by any suitable means to the support that receives it, and in particular by means of a strip of adhesive 7 applied to its fixing portion 3, it being understood that the elastically-deformable portion 5 of the pillar 14 is situated beside the door frame, whereas the pillar 12 is deformed by the zone of contact between the gasket and the body.

Figure 4:
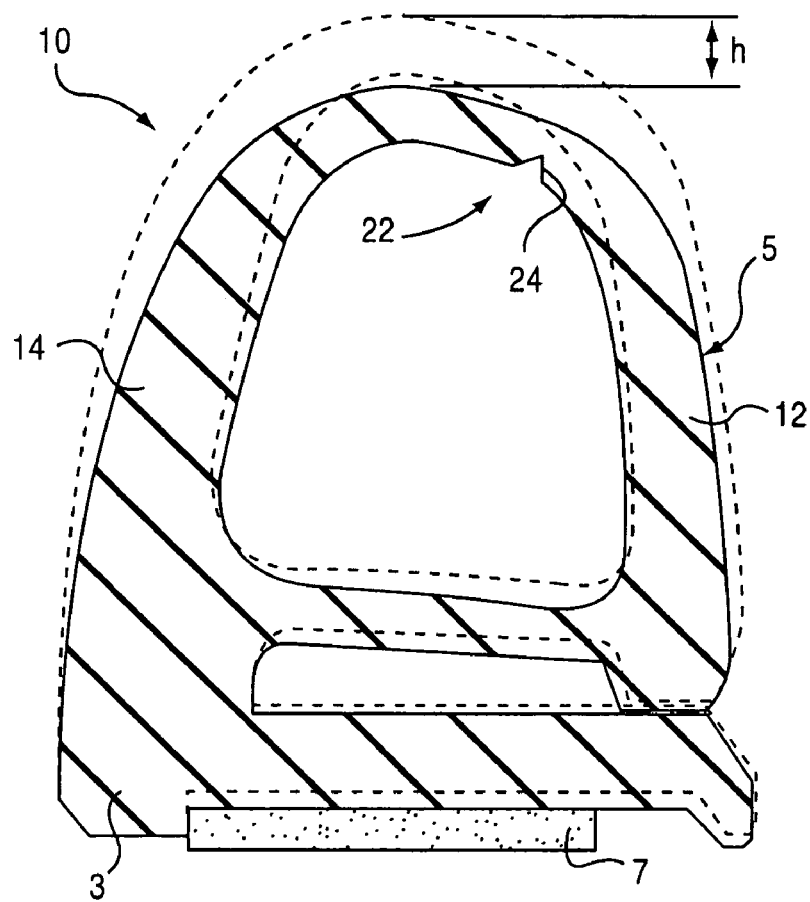
FIG. 4 is a section view of the FIG. 3 sealing gasket in the deformed state.
Figure 5:
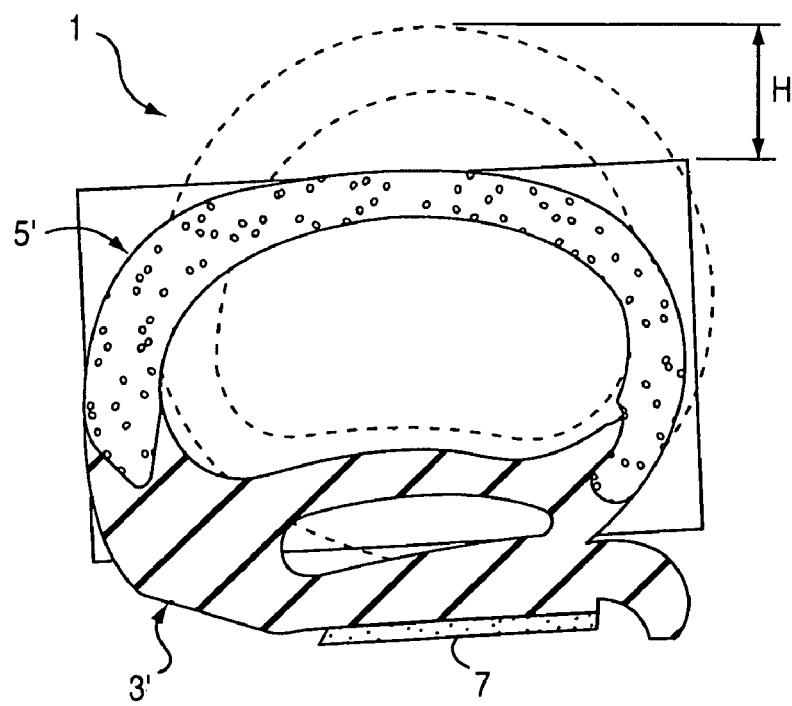
FIG. 5 is a section view of a prior art sealing gasket in the deformed state.

With such a sealing gasket 10 mounted in a door corner of small radius of curvature, for example as shown in FIG. 4, it can be seen that the loss of height h of the gasket 10 is not more than 2.5 mm, and that the gasket 10 deforms in such a manner that its right cross-section is contained in the right cross-section of the gasket 10 when in the free state, as drawn in chain-dotted lines. In contrast, with a prior art gasket 1 as shown in FIG. 5, the loss of height H of the gasket is considerably greater and its deformation is such that its right section is flattened to a much greater extent and projects significantly from the section of the gasket 1 in the free state as drawn in chain-dotted lines. That is why it is necessary to perform specific treatment to the prior art gasket 1, e.g. a thermoforming operation, in order to compensate in part for this loss of height H.

Furthermore, it is well known for certain vehicles that when the door sealing gasket is in place on a door, it can mask the edge of a panel lining the door. Under such circumstances, and as shown in dashed lines in FIG. 3, the end of the lining panel P can be received adjacent to the pillar 12 of the gasket 10 between the base 11 of the elastically-deformable portion 5 of the gasket and its fixing portion 3. The elastically-deformable portion of the gasket is thus raised by the lining panel P, thus having the effect of producing a loss of height h that is regular for the gasket 10 in a door corner having a small radius of curvature, and obtaining deformation in the right cross-section of the gasket 10 that occupies the right section of the gasket in the free state even better. In addition, the sheet metal T constituting the gasket support 10 may form a shoulder beside the pillar 14 that serves as a lateral abutment for the elastically-deformable portion 5 of the gasket 10 so as to prevent it from tilting in the wrong direction.

The fixing portion 3 of the gasket, also known as its "sole plate" can also present bearing portions 19 and 20 of extra thickness (see FIG. 3), substantially on either side of the adhesive 7 in order to limit the loss of height h of the gasket in a corner of the support that presents a small radius of curvature.

Advantageously, means 22 can be added to weaken the compressibility forces of the gasket 10, these means 22 being constituted, for example, by at least one hinge-forming line of weakness 24 formed in the inside wall 16 of the elastically-deformable portion 5 of the gasket, e.g. in its arch, in particular (FIG. 4).

In general, the pillars 12 and 14 of the gasket 10 can be asymmetrical, for example having a pillar 14 that is of greater thickness for improving sound damping and retention of the gasket 10 in zones of the support receiving it that have a small radius of curvature, and a pillar 12 of smaller thickness in order to reduce the compressibility forces of the gasket. Furthermore, in order to limit the loss of height h of the gasket and in order to limit compression of its elastically-deformable portion 5, as shown in particular in FIG. 6, the pillar 14 may be made at least in part out of an elastically-deformable material that is flexible, semi-rigid, or rigid. Finally, the pillars 12 and 14 in the base portion 11 formed by the elastically-deformable portion 5 of the gasket 10 may be of greater thickness in order to constitute a kind of beam for supporting the gasket 10.

In addition, the arch-shaped portion uniting the two pillars 12 and 14 of the elastically-deformable gasket 5 of the gasket 10 and forming the sealing zone of said gasket presents a width in right section that is smaller than the width of a prior art gasket. This results in greater flexibility in the positioning of the gasket on the support that receives it, which is particularly advantageous when the gasket is put into place by a robot suitable for enabling changes in the path followed by the gasket.

Figure 6:
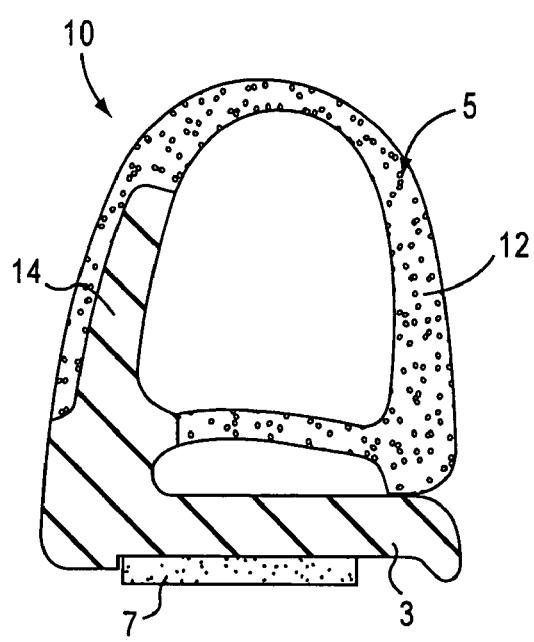
FIG. 6 is a section view of another embodiment of a sealing gasket of the invention.
Figure 7:
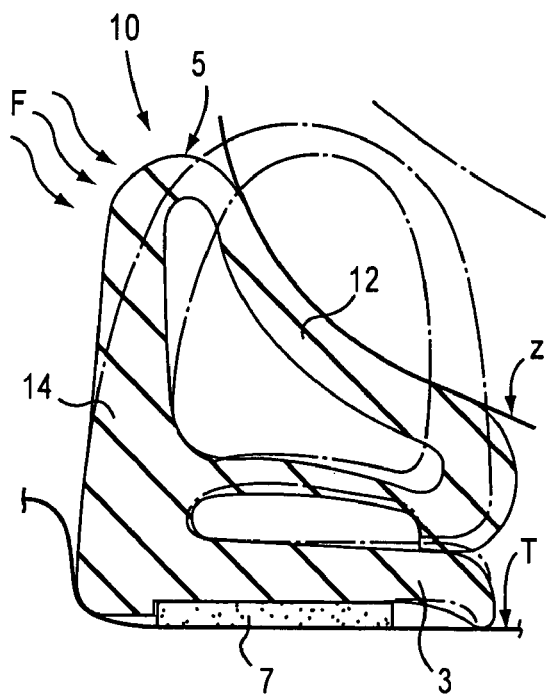
FIG. 7 is a section view of the FIG. 6 sealing gasket in a corner having a small radius of curvature.

FIG. 7 shows the gasket 10 of FIG. 6 mounted on a door in its state where it is deformed by the bodywork zone Z when the door is closed, the thicker pillar 14 then improving the stopping of soundwaves represented by arrows F, the pillar 14 pressing, for example, against a shoulder in the sheet metal T of the door.

Figure 8:
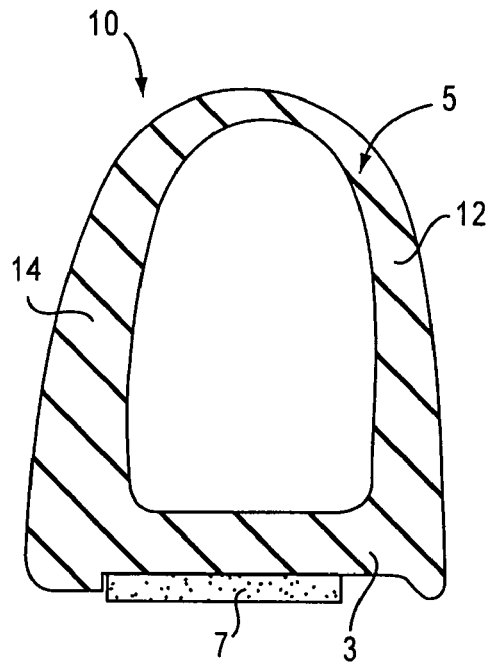
FIGS. 8 and 9 are section views of two other embodiments of a sealing gasket of the invention.
Figure 9:
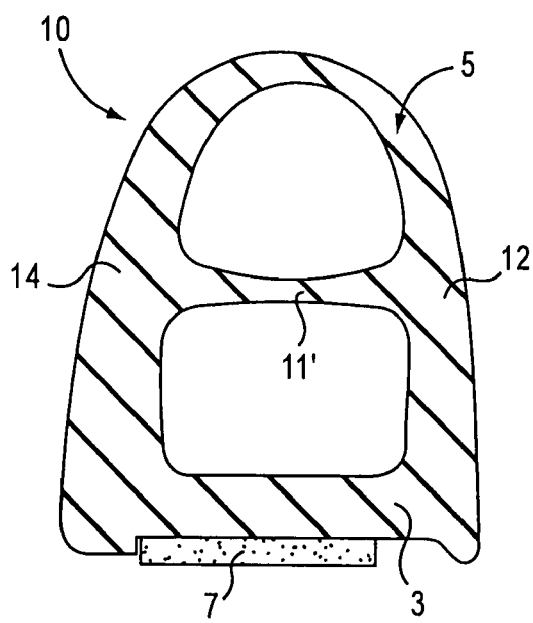

In FIGS. 8 and 9, two other sealing gaskets 10 of the invention are shown. In the gasket of FIG. 8, the two pillars 12 and 14 of the elastically-deformable portion 5 are directly connected to the fixing base 3 of the gasket 10, whereas FIG. 7 is of the same configuration as FIG. 9 except that the elastically-deformable portion 5 is constituted by two tubes with an intermediate partition 11'.

In general, one end of the gasket 10 may include one or more reinforcing threads 25 in its fixing portion 3 (see FIG. 3) and also one or more strips, making the gasket easier to extrude, and above all making it easier to put into place by means of a dynamic system robot. These threads serve to limit the extent to which the gasket can lengthen while it is being put into place on its support.

Figure 10:
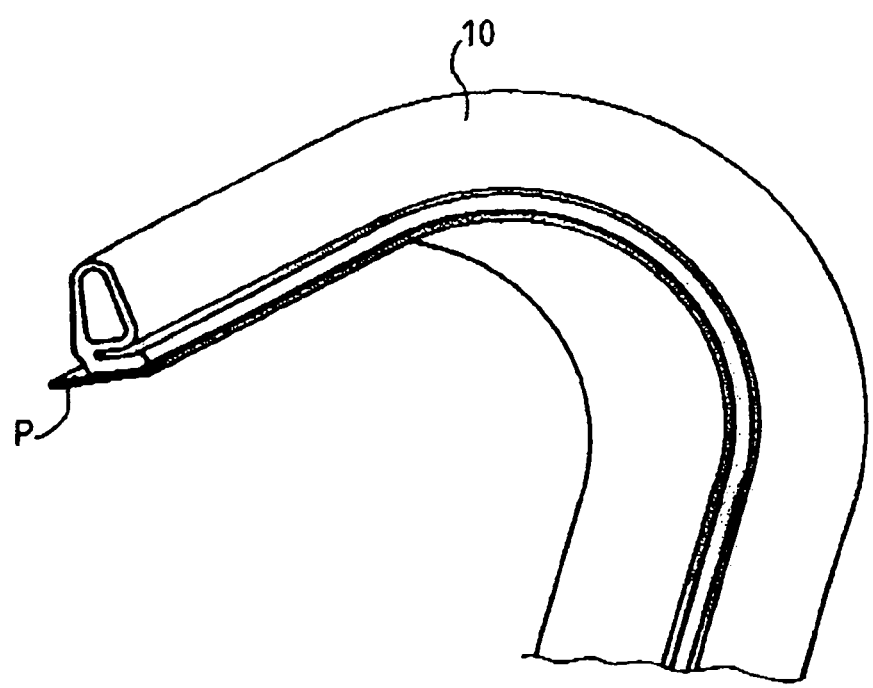
FIG. 10 is a fragmentary perspective view of a gasket of the invention mounted in a zone of the support that receives it that presents a corner having a small radius of curvature.

Finally, FIG. 10 is a perspective view of a sealing gasket 10 mounted on a support for receiving it such as a door P in a zone of the support that presents a corner having a small radius of curvature.

A sealing gasket of the invention can be mounted on any door, trunk, or hood of a motor vehicle in manual, semi-automatic or automatic manner, it being understood that the vehicle may equally well be a car, a utility vehicle, a truck, or bus, a train, and an airplane. The sealing gasket can be stored and supplied to an assembly line on a drum, a pallet, or a container of great length.

What is claimed is:

1. A combination of a motor vehicle door and a sealing gasket mounted on a support of said door, the motor vehicle door being designed to close a vehicle bodywork zone, the support including at least one corner having a small radius of curvature, the gasket comprising at least a flexible or semi-rigid fixing portion fixed to the support by an adhesive and an elastically-deformable tubular portion for providing sealing, the elastically-deformable portion having a non-deformed cross-section in a free state and a deformed cross-section in a deformed state which is due to the mounting of the gasket on the at least one corner of the support, said deformed cross-section occupies an area which is substantially within that area occupied by said non-deformed cross-section, wherein said elastically-deformable portion of the gasket includes a base portion which is connected to said fixing portion at only at one end of said base portion.

2. The combination according to claim 1, in which the elastically-deformable portion of the gasket is substantially triangular in cross-section and has two lateral pillars united with each other by an arch and forming between the two lateral pillars, an angle of about 10° to about 30°, said angle being defined using two straight lines passing substantially through the middles of the pillars at ⅖ths and at ⅘ths of the total height of the gasket.

3. The combination according to claim 2, wherein the angle is about 20°.

4. The combination according to claim 2, wherein inner and outer top portions of the arch of the elastically-deformable portion are situated on two circles having centers that are spaced apart from each other by a distance of more than 0.7 mm.

5. The combination according to claim 1, wherein a height of said gasket change no more than 2.5 mm between said free state and said deformed state when said radius of curvature is less than or equal to 80 mm and said corner extends over an angle that is less than or equal to 80°.

6. The combination according to claim 1, wherein the gasket includes an arch which facilitates positioning of the gasket on the support by a robot.

7. The combination according to claim 1, wherein the fixing portion includes bearing portions situated substantially on either side of the adhesive in order to limit deformation of the gasket.

8. The combination according to claim 1, in which the fixing portion of the gasket includes a reinforcement.

9. The combination according to claim 1, in which means are provided for weakening compressibility forces of said gasket.

10. The combination according to claim 9, in which said means are constituted by at least one weakened area in the elastically-deformable portion of the gasket.

11. The combination according to claim 1, in which the gasket is mounted directly on the support without being subjected to any thermoforming operation in said corner of the support.

12. The combination according to claim 1, in which the gasket is stored on a drum, on a pallet, or in a container.

13. The combination of claim 1, wherein said base portion extends substantially parallel to said fixing portion.

* * * * *